US012673657B2

(12) United States Patent
Rivas Pinilla

(10) Patent No.: US 12,673,657 B2
(45) Date of Patent: Jul. 7, 2026

(54) GROUND-EFFECT HOVERCRAFT VEHICLE WITH RETRACTABLE WINGS

(71) Applicant: Enrique Jose Rivas Pinilla, San Isidro de Abona (ES)

(72) Inventor: Enrique Jose Rivas Pinilla, San Isidro de Abona (ES)

( * ) Notice: Subject to any disclaimer, the term of this patent is extended or adjusted under 35 U.S.C. 154(b) by 521 days.

(21) Appl. No.: 18/255,024

(22) PCT Filed: Mar. 7, 2022

(86) PCT No.: PCT/ES2022/070128
§ 371 (c)(1),
(2) Date: May 30, 2023

(87) PCT Pub. No.: WO2022/189685
PCT Pub. Date: Sep. 15, 2022

(65) Prior Publication Data
US 2024/0092336 A1 Mar. 21, 2024

(30) Foreign Application Priority Data
Mar. 9, 2021 (ES) ................................ U202100093

(51) Int. Cl.
B60V 1/11 (2006.01)
B60V 1/04 (2006.01)

(52) U.S. Cl.
CPC . B60V 1/11 (2013.01); B60V 1/04 (2013.01)

(58) Field of Classification Search
CPC ................ B60V 1/04; B60V 1/11; B60V 1/14
See application file for complete search history.

(56) References Cited

U.S. PATENT DOCUMENTS

| | | | |
|---|---|---|---|
| 2,940,688 A * | 6/1960 | Bland ..................... | B60F 5/02 |
| | | | 114/102.16 |
| 4,080,922 A * | 3/1978 | Brubaker ............... | B63B 1/322 |
| | | | 114/282 |
| 5,267,626 A | 12/1993 | Tanfield, Jr. | |
| 6,082,665 A * | 7/2000 | Spitzer ................... | B64C 37/00 |
| | | | 246/221 |

(Continued)

FOREIGN PATENT DOCUMENTS

| | | |
|---|---|---|
| GB | 936763 A | 9/1963 |
| WO | 2005039972 A2 | 5/2005 |
| WO | 2010076776 A2 | 8/2010 |

OTHER PUBLICATIONS

International Search Report for Corresponding International Application No. PCT/ES2022/070128 and English Translation (8 Pages) (Apr. 29, 2022).

*Primary Examiner* — Minnah L Seoh
*Assistant Examiner* — Hosam Shabara
(74) *Attorney, Agent, or Firm* — LUCAS & MERCANTI, LLP

(57) ABSTRACT

A ground-effect amphibious hovercraft vehicle having a system of retractable wings (8), which are retracted (parking mode) by retracting arms (17a and 17b) of both wings by a head (19). At the same time, the vehicle acts as a ground-effect hovercraft vehicle when the wings (8) are extended (flight mode), which is done by extending the arms (17a and 17b) of both wings by the head (19). The head (19) is extended/retracted using a cylinder (22) moved by a drive motor (18), which may be an electric motor, a hydraulic motor or a mechanical motor, or manually using cables and pulleys.

8 Claims, 8 Drawing Sheets

(56)     References Cited

U.S. PATENT DOCUMENTS

| 6,230,835 B1 * | 5/2001 | Fischer | B60V 1/22 |
| | | | 114/283 |
| 8,596,570 B1 | 12/2013 | Carambat | |
| 10,207,795 B2 * | 2/2019 | Thompson | B64C 23/072 |
| 10,363,858 B1 | 7/2019 | Woodall | |
| 10,752,338 B2 * | 8/2020 | Kelly | B64U 30/12 |
| 11,091,259 B2 * | 8/2021 | Pierce | B64C 39/12 |
| 2006/0162638 A1 * | 7/2006 | Boncodin | B60V 1/08 |
| | | | 114/272 |
| 2011/0168834 A1 * | 7/2011 | Yoeli | B64C 1/22 |
| | | | 244/12.3 |

* cited by examiner

GROUND-EFFECT HOVERCRAFT VEHICLE WITH RETRACTABLE WINGS

CROSS-REFERENCE TO RELATED APPLICATIONS

This application is a 371 of PCT/ES2022/070128, filed Mar. 7, 2022, which claims the benefit of Spanish Patent Application No. U202100093, filed Mar. 9, 2021, each of which are incorporated herein by reference.

TECHNICAL FIELD OF THE INVENTION

The present invention or utility model relates to an amphibious hovercraft and in turn a ground effect hovercraft, which have applicability in the naval aircraft industry.

Background of the Invention

In the prior art, the different types of hovercraft are already known, as for example such as in the aforementioned ES 0225368 U; ES 0295423 U; ES 1009032 U. Always sliding through the air cushion, so that on its perimeter it carries a flexible mudflap, to be able to maintain the air pressure in its chamber which gives it that height to move on medium regular surfaces and without being in contact with them.

Also, in the prior art are known and there are different types of skirts constructed to thereby achieve better efficiencies in their stability and maintain their overpressure, as for example such as in the cited ES 0355296 A1; ES 0366947 A1; ES 0464249 A3.

These ground effect vehicles are also known in the prior art, as well as others of similar features, such as the aforementioned ES 2387784 E1.

It is also known that there are ground effect hovercraft, with fixed wings of a wingspan of between 6.1 meters, which usually fly at a ground height of about 6 meters, with a cruising speed of about 105 K/h. With crew cabin between 4 and 5 passengers, according to configuration and model. I have not been able to refer to them, as I have not found them in the INVENES database of the SPTO. To cite a reference to this type of vehicle of similar characteristics described in this paragraph, of the Universal HoverCraft brand, vehicle 19 XRW Hoverwing.

The prior art is also aware that all these types of amphibious or ground effect hovercraft are designed to have a very good buoyancy, and in the manufacture of these hovercraft various materials are employed, fiberglass, kevlar fiber, pvc, polystyrene, polyurethane, aluminum, plywood, etc., lightening them in weight.

Also, the state of the art knows that in its propulsion and rising, one to several motors are usually used, depending on their size and their applications. Thus, in these propulsion and rising systems, the transmission or coupling of these motors may be both direct and indirect.

DESCRIPTION OF THE INVENTION

The present amphibious and ground effect hovercraft, which is proposed for this invention or utility model, has been significantly improved, to enhance its functionality and effectiveness. In order do this, and to go from being an amphibious hovercraft to a ground effect hovercraft or vice versa, it has been equipped with wings. These wings are not fixed, nor removable, these wings are retractable, allowing you to access and perform the basic functions, such as amphibious hovercraft and ground effect hovercraft.

Being a hovercraft perfected as an amphibian and as a ground effect hovercraft, to have these features in turn, in its chassis or fuselage the space or wing chamber has been placed, in which the wings are located and the extender/retractable system, which is in charge of extending or retracting the wings by means of a head. This head can be driven by an electrical, hydraulic, mechanical system or by cable and pulleys. Next and below this chamber, there follows the air expansion chamber, in which at its upper part the attachments of the bag-like mudflap are placed, which doses the air throughout its perimeter towards the lower air cushion, by overpressure. By ending in this in its lower part, where it also has fixings the mudflap type fingers in its perimeter, in the flotation base.

With this system of retractable wings, its accessibility and mobility are increased, allowing it according to the chosen mode retracted wings (parking mode), navigation as an amphibious hovercraft, with the same mobility as a hovercraft of its class. With extended wings (flight mode), navigation as a ground effect hovercraft, fly over a height of the surface between 5 to 10 meters, being able to free small and medium obstacles, as well as waves in the sea, because all this depending on its configuration and loads. With the advantage of being able to access both navigation systems at the desired time since this does not create an obstacle for other embarkations or traffic.

Its wings are not the typical straight or square ones that usually carry the models that I have described in the last paragraph of page 2, it has opted for a construction wing from highest to lowest in addition, they have incorporated other elements of functionality such as: the improvement of the leading angle. The flaps or "flaps" increase-of-lift devices, giving the greatest possibility to fly at less speed and enjoy that flight, in addition to helping its rising and descent. The ailerons, together with the rudder, for easier and more control of turns. Wing tip or "winglet" devices to eliminate the effects of turbulence that could be generated in the wings, there are several types or shapes, which as necessary will be the option and placement.

DESCRIPTION OF THE DRAWINGS

In order to help its understanding, drawings are attached as an integral part of said description with illustrative and non-limiting character, where the figures and their details have been represented in the following order.

A 8, wing. 16, wing hinge axis. 20, mechanism box. 23a, 17a hinge axis, extender/retractor arm of front wing beam; 23b, 17b hinge axis, extender/retractor arm of rear wing beam.

Figure 1:
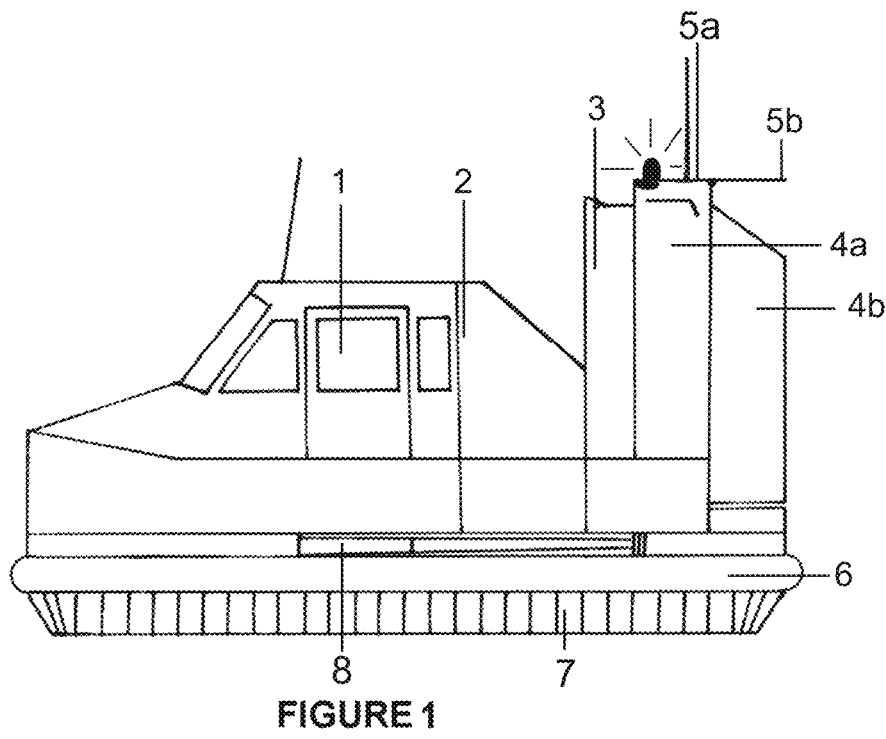
FIG. 1. Shows the profile of the left side, where 1, is the crew/passenger cabin. 2, engine room. 3, is the duct or fairing of the propeller. 4a, is the drift; 4b, is the rudder. 5a, horizontal stabilizer; 5b, is the depth rudder. 6, bag-type mudflap, throughout its perimeter. 7, finger type mudflap, with inward discharge, front and side perimeter. 8, wing retracted and housed in chassis or fuselage.
Figure 2:
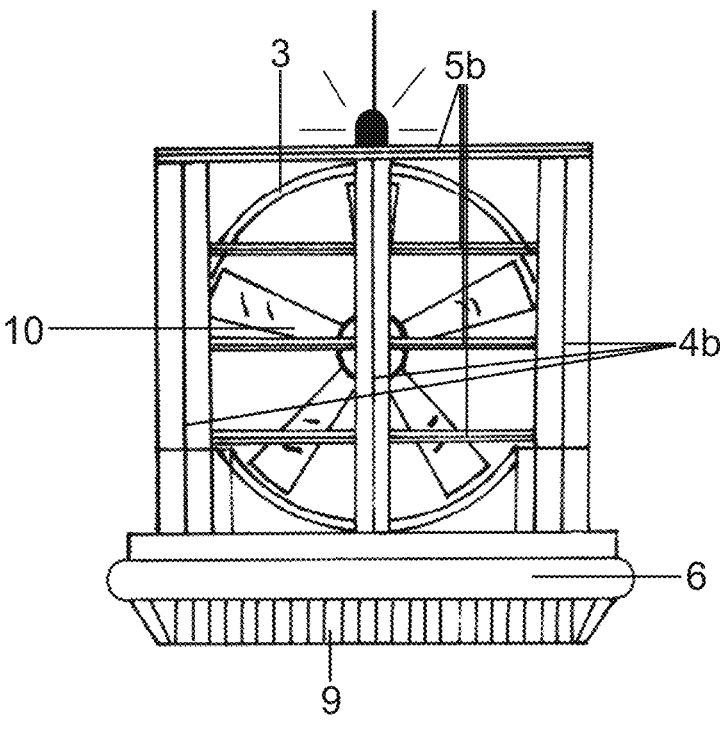
FIG. 2. Shows the rear profile, where 3, the duct or propeller fairing. 4b, are the rudders. 5b, are the depth rudders. 6, bag-type mudflap. 9, vertical discharge finger type mudflap, to prevent the mudflap from collecting or accumulating elements or materials in its circulation. 10, two-blade or multi-blade propeller, since this can vary depending on the size and according to the application model.
Figure 3:
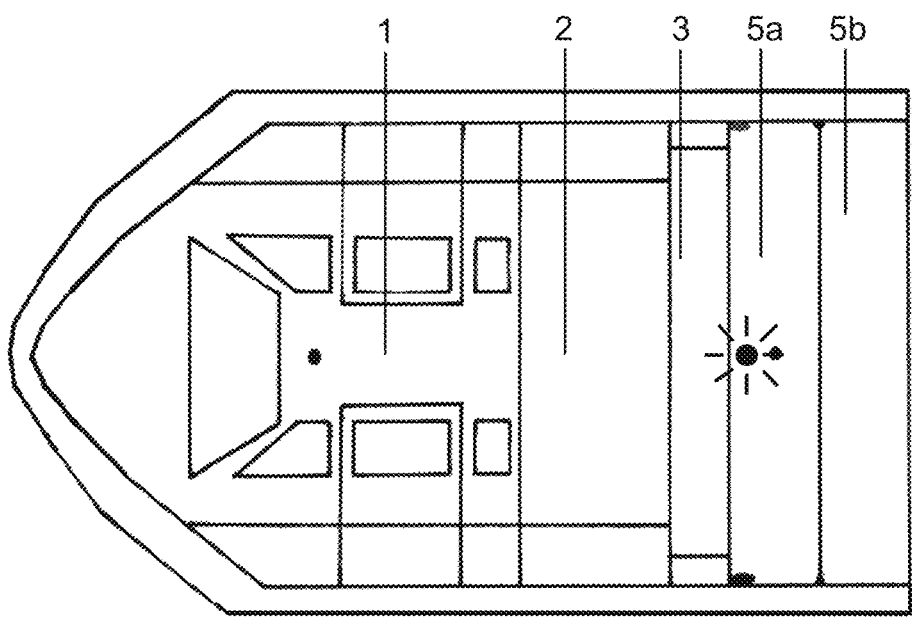
FIG. 3. Displays the floor profile, where 1, crew/passenger cabin. 2, engine room. 3, propeller duct or cowl. 5a, is the horizontal stabilizer; 5b, depth rudder.
Figure 4:
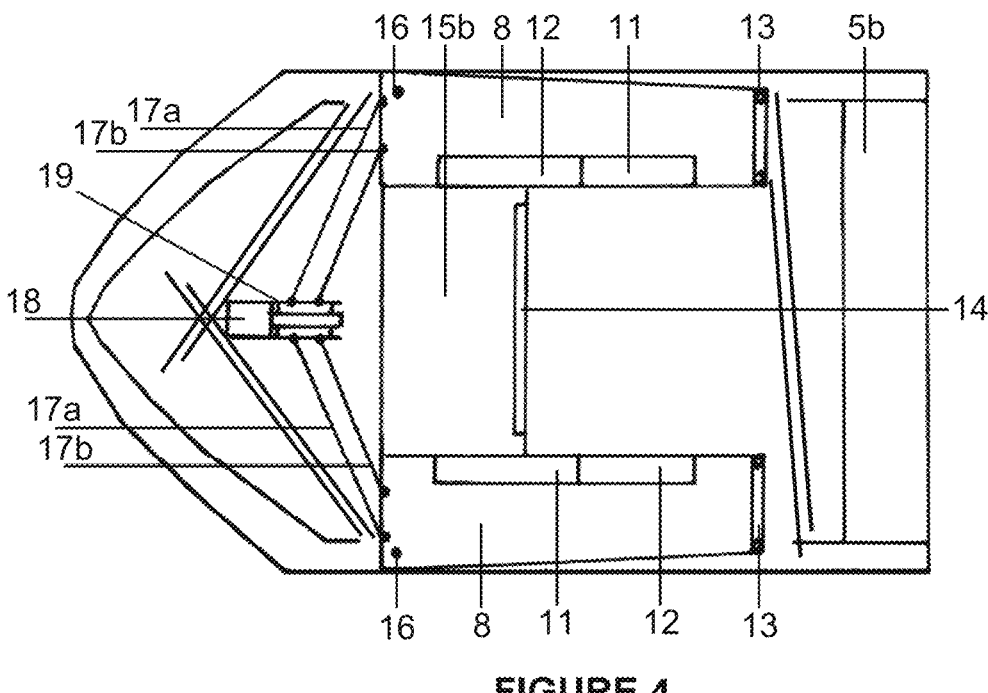
FIG. 4. It shows the profile in plan, showing a view where the object of this invention is schematized, "the retractable wings". Where 5b, rudder depth. 8, wings, in retracted and anchored positions (parking mode). 11, aileron. 12, flaps or "flaps". 13, Wing tip or "winglet" devices. 14, structural reinforcement between the upper plate 15a and the lower plate 15b, and in turn serves as a stopper of the wing extender/retractor head system. In this reinforcement are installed the sensors, approach/stop and safety, corresponding to 19, extender/retractor head. 15b, lower base plate, made of marine structural grade aluminum where the entire wing system is supported. 16, wing hinge axis. 17a, retracted position arm of front wing beam. 17b, retracted position arm of rear wing beam. 18, head drive motor. 19, retracted position head of the wing extenders. This system has been indicated that it can be mobilized by the following means, electric, hydraulic, mechanical, or manual by means of cables and pulleys. This all depends on the type of model in question.
Figure 5:
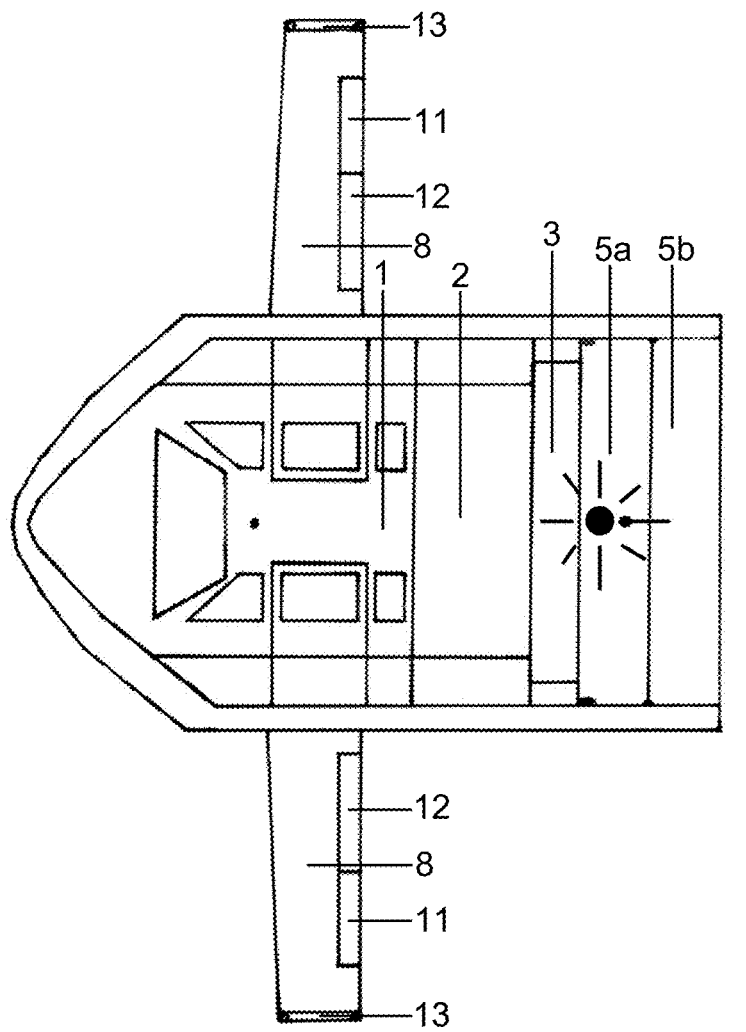
FIG. 5. Shows the profile in plan, showing the extended and anchored wings (flight mode), where 1, crew/passenger cabin. 2, engine room. 3, propeller duct or cowl. 5a, horizontal stabilizer; 5b, depth rudder. 8, wings. 11, aileron. 12, flaps or "flaps". 13, Wing tip or "winglet" devices.
Figure 6:
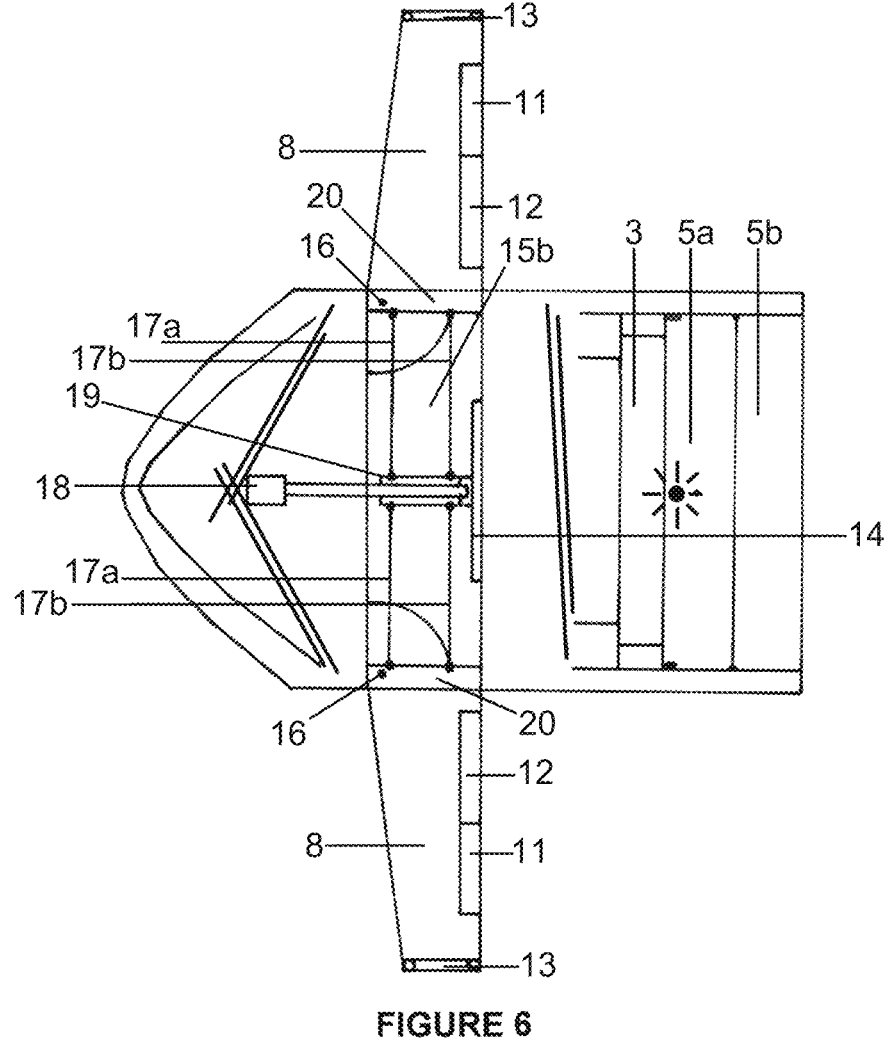
FIG. 6. It shows the profile in plan, showing a view where the object of this invention is schematized, "the extended wings", where 3, duct or fairing of the propeller. 5a, horizontal stabilizer; 5b, depth rudder. 8, wings in extended and anchored position (flight mode). 11, aileron. 12, flaps or "flaps". 13, Wing tip or "winglet" devices. 14, structural reinforcement, between the plates 15a and 15b, and in turn serves as a stop of the wing extender/retractor head system. In this reinforcement two sensors are installed, one for approach/stop and the other for safety, corresponding to 19, extender/retractor head. 15b, lower base plate made of marine structural grade aluminum where the entire wing system is supported. 16, wing hinge axis. 17a, extended position arm of front wing beam. 17b, extended position arm of rear wing beam. 18, head drive motor. 19, extended position head of the wing extenders. 20, wing system mechanism box.
Figure 7:
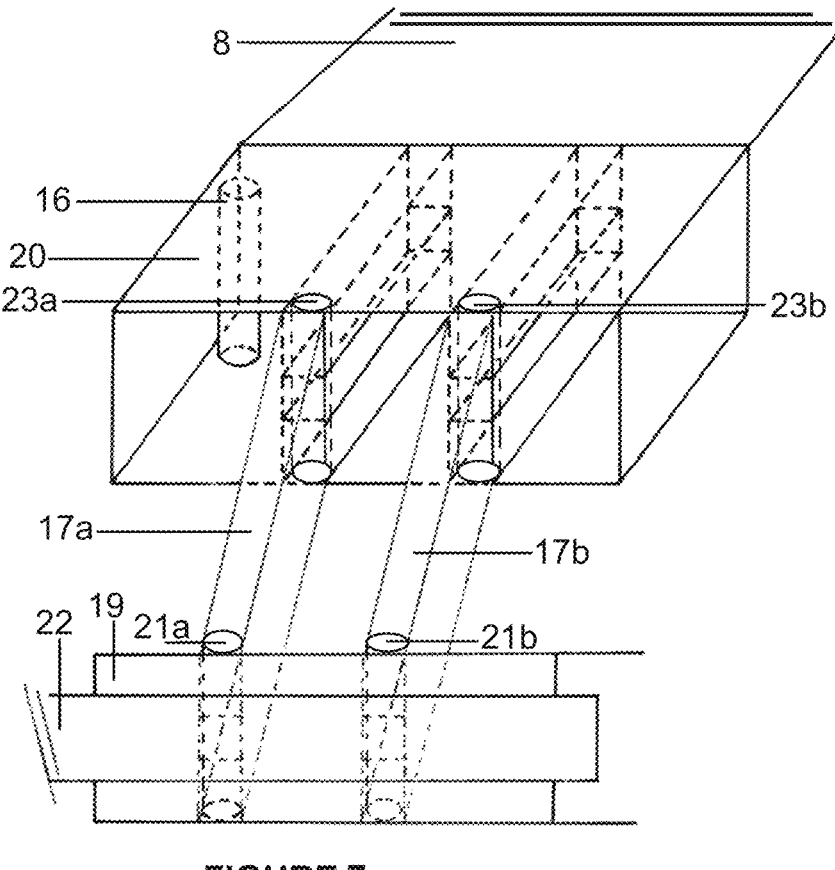
FIG. 7. It shows part of the detail of the extender/retractor head, the wing system mechanism box, wing hinge axis and wing arm extender/retractor hinge axes. Where, 19, extender/retractor head sectioned, looking at a 21a, hinge axis 17a, of the extender/retractor arm of the front beam of the wing; a 21b, hinge axis of the 17b, extender/retractor arm of the rear wing beam. 22, extender/retractor cylinder.
Figures 8, 9:
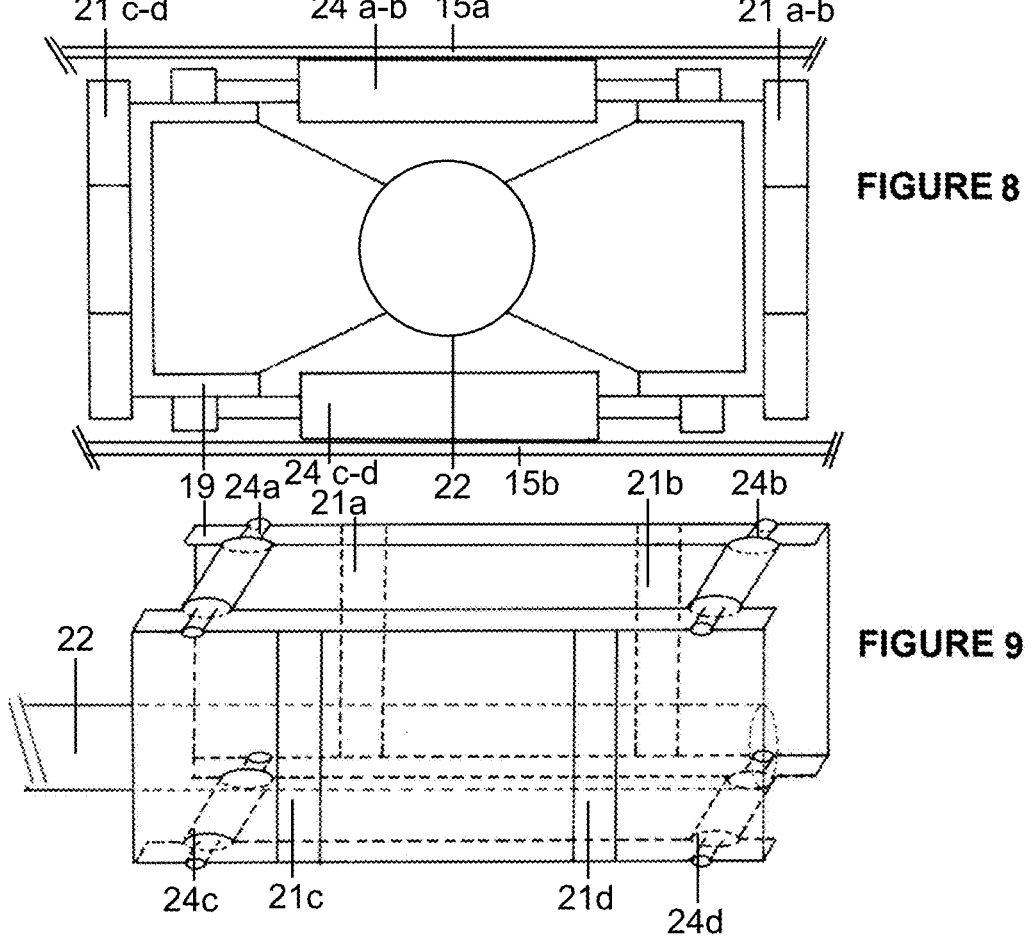

FIGS. 8 and 9. They show in front and side detail respectively of the extender/retractor head. Where 19, there is the head with arrangement of its corresponding hinge axes and adjustment rollers of the rolling channels. Where 15a, upper base plate and 15b, lower base plate. 21a and b, 17a and b hinge axes, right wing front and rear beam extender/retractor arm; 21c and d, 17c and d hinge axes, left wing front and rear beam extender/retractor arm. 24a and b, upper adjustment and rolling rollers of head; 24c and d, lower adjustment and rolling rollers of head. 22, extender/retractor cylinder.

Figure 10:
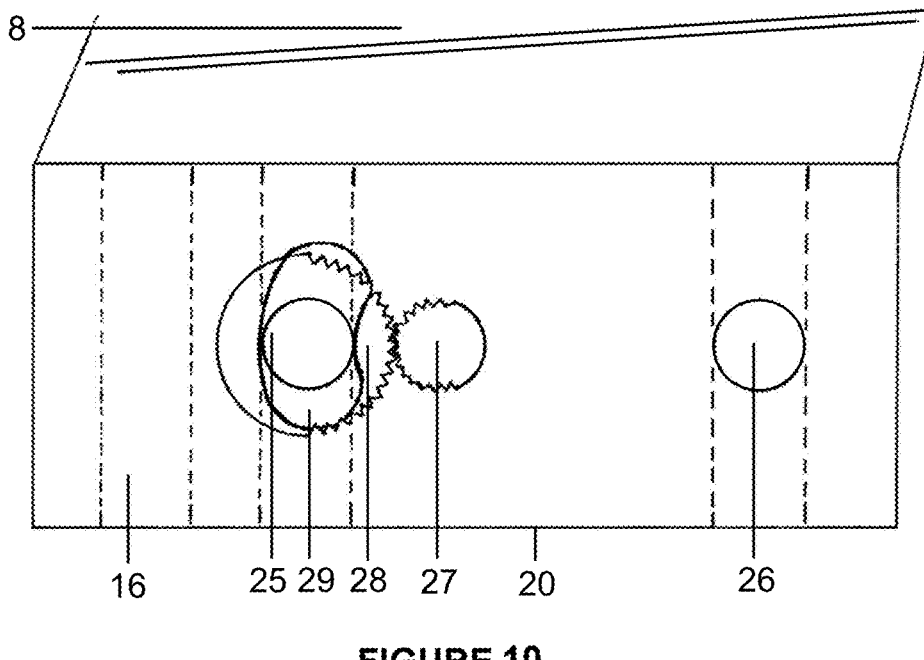

FIG. 10. Shows in detail the inner front of 20, wing mechanism box. Where 8, is wing. 16, wing hinge axis. 25, front wing beam. 26, rear wing beam. 27, variator driving pinion of leading angle of the wing. 28, variator receiving pinion of leading angle of the wing. 29, guide channel, for the displacement of the front beam, according to the leading angle. When some variation of the leading angle is made, the 26, rear beam, is the main axis of support for the displacement of the leading angle.

Between the front beam 25 of the wing and the hinge axis 23a, this joint is constituted by a hinged axis, so that it can allow the oscillation of displacement by 29, guide channel. This takes all the incidence without losing the support point of 25, front wing beam.

In 20, wing mechanism box, two sensors are also installed, one for approach/stop and one for safety.

Figure 11:
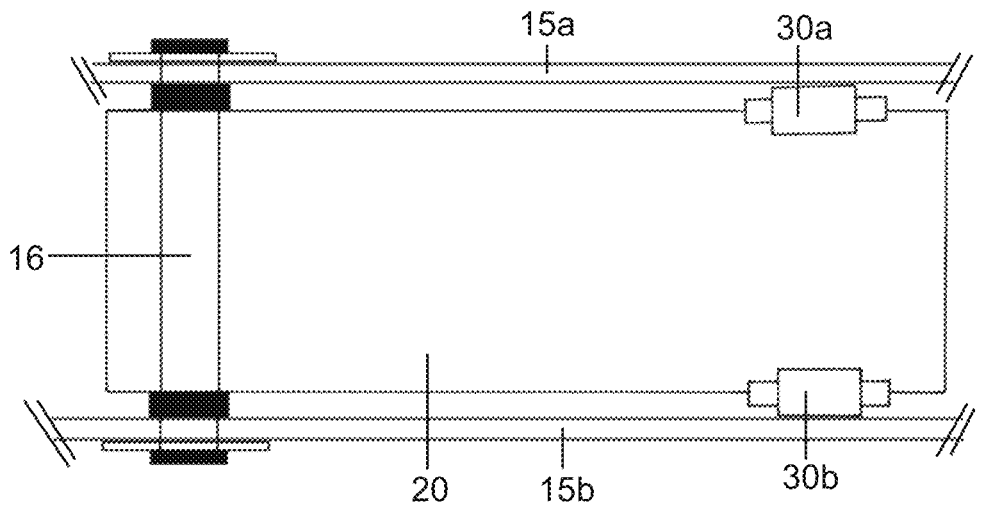

FIG. 11. Shows in inner and outer front detail of 20, wing mechanism box. Where 15a, upper base plate; 15b, lower base plate. 16, wing hinge axis. 30a, upper adjustment and rolling roller of wing box; 30b, lower adjustment and rolling roller of wing box.

Figure 12:
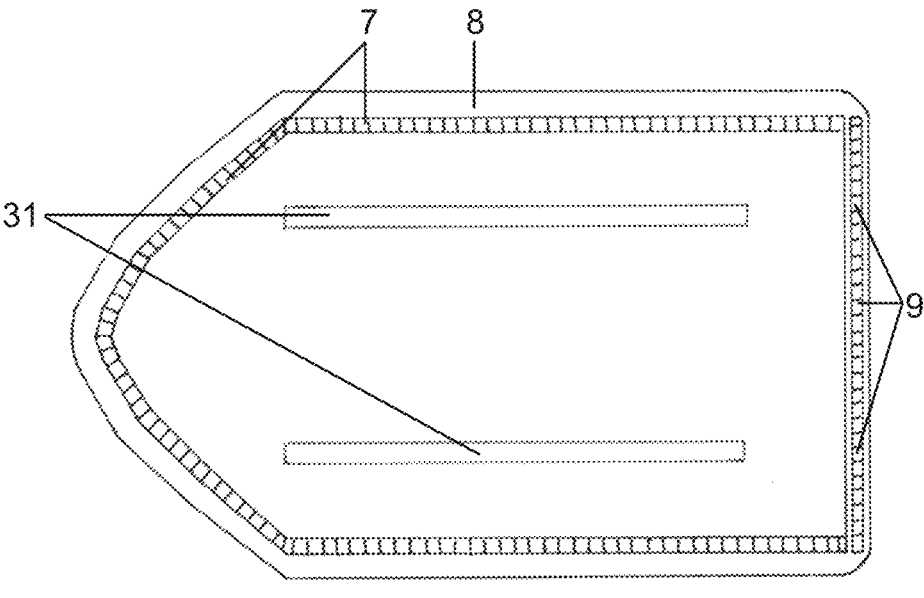

FIG. 12. Shows lower floor profile (flotation base), where 6, bag-type mudflap, throughout its perimeter. 7, finger-type mudflap, on the side and front perimeter, for inward discharge, increasing the rising chamber. 9, finger-type mudflap with vertical discharge, only at the rear, to prevent the mudflap from collecting or accumulating elements or materials in its path. 31, parking skids on firm surface.

PREFERRED EMBODIMENT OF THE INVENTION

For its construction, in the basic part of the hovercraft, the construction observations and recommendations registered in the manual Maritime and Coastguard Agency's Hovercraft Code "The Hovercraft Code, of the Maritime & Coastguard Agency" are counted as references, in order to comply with the requirements of the International Maritime Organization (IMO).

In the construction or manufacture of the chassis or fuselage of this ground effect amphibious hovercraft, the various materials already known by the technique will be used, as well as glass fiber, kevlar fiber, pvc, polystyrene, polyurethane, aluminum, plywood, etc.

The drive motor or the rising motor that will be adapted will be those available in the current market, those that can be internal combustion, electric or hydraulic will be those of defined applications, according to applications and needs.

The cabin is designed for a crew of five, including the pilot, all separated in separate seats with their seat belt systems.

The cabin is equipped with the command-and-control systems, as well as the signaling and lighting elements that correspond to both the hovercraft and the ground effect vehicle, an alert panel of the installed equipment. The navigation system will be the one that corresponds to the navigation area, as well as its telecommunications equipment, in addition to those required by regulations.

The cabin is equipped with two side doors in the shape and design of a gull wing, one to starboard and one to port, for better access, both entry and exit. Once closed the doors are watertight, carrying installation of air conditioning, heating and cooling power system, in addition to natural filtered and mechanized external entry. With the crew and propulsion cabins being soundproofed.

INDUSTRIAL APPLICABILITY

With these improvements it has a wide field of application in the aeronautical industry, in which various materials of light construction will be used. And in the field and its application can be civil (coast surveillance, swamps, rivers, civil protection, rescue), commercial (small air taxi between the coast, other services), military (patrols, reconnaissance), recreation, etc.

The invention claimed is:

1. A hovercraft comprising retractable wings (8) having extender/retractor arms (17a and 17b) connected by means of a retracting/extending head (19), wherein the head (19) is extended/retracted by a cylinder (22), and is mobilized by a drive motor (18), wherein the retractable wings (8) are mounted on a wing mechanism box (20), wherein the wing mechanism box is installed between base plates (15a and 15b), together with a structural reinforcement (14) under a chassis or fuselage of the hovercraft, wherein when the extender/retractor arms (17a and 17b) of the retractable wings (8) are extended flight mode), the hovercraft is configured in ground effect hovercraft mode, and when the extender/retractor arms (17a and 17b) of the retractable wings (8) are retracted (parking mode), the hovercraft is configured in amphibious hovercraft mode.

2. The hovercraft according to claim 1, wherein the retracting/extending head (19) allows extension/retraction of the extender/retractor arms through hinge axes (21a and 21b) of a right wing and hinge axes (21c and 21d) of a left wing of the retractable wings.

3. The hovercraft according to claim 1, wherein the retracting/extending head (19) and the structural reinforcement (14) further comprises front and rear beams (25 and 26), upper adjustment and rolling rollers (24a and 24b), and lower adjustment and rolling rollers (24c and 24d) which maintain the retractable wings' load.

4. The hovercraft according to claim 1, wherein the wing mechanism box (20) comprises an upper adjustment and rolling roller (30a) and a lower adjustment and rolling roller (30b).

5. The hovercraft according to claim 1, wherein the retractable wings (8) further comprises flaps, improving the lift, and ailerons (11), which together with a rudder (4b), facilitate and have greater control of turns, and wherein a "winglet" devices (13) eliminates the effects of turbulence that could be generated in the wings.

6. The hovercraft according to claim 1, wherein the wing mechanism box (20) comprises a drive pinion (27) that is driven by motor and reducer, a receiving pinion (28), which is integrally joined to the front beam (25), which performs oscillation sliding in a guide (29).

7. The hovercraft according to claim 1, wherein the drive motor (18) is selected from the group consisting of electric, hydraulic, mechanical, and manual motor.

8. The hovercraft according to claim 1, wherein the drive motor (18) comprises cables and pulleys.

\* \* \* \* \*